United States Patent
Ye et al.

(10) Patent No.: US 9,131,341 B2
(45) Date of Patent: Sep. 8, 2015

(54) SYSTEM AND METHOD FOR LOCATING A MOBILE DEVICE

(71) Applicant: Tencent Technology (Shenzhen) Company Limited, Shenzhen (CN)

(72) Inventors: Yinghua Ye, Shenzhen (CN); Yuejiao Hou, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 14/226,750

(22) Filed: Mar. 26, 2014

(65) Prior Publication Data

US 2014/0357198 A1    Dec. 4, 2014

Related U.S. Application Data

(63) Continuation of application No. PCT/CN2013/090001, filed on Dec. 19, 2013.

(30) Foreign Application Priority Data

May 28, 2013   (CN) .......................... 2013 1 0204045

(51) Int. Cl.
*H04W 4/00*   (2009.01)
*H04W 4/02*   (2009.01)

(52) U.S. Cl.
CPC ...................... *H04W 4/02* (2013.01)

(58) Field of Classification Search
CPC .................................. H04W 4/14; H04W 4/12
USPC ...................................... 455/73, 466
See application file for complete search history.

(56) References Cited

U.S. PATENT DOCUMENTS

| | | | |
|---|---|---|---|
| 7,765,265 B1* | 7/2010 | Granito et al. ................ 709/206 |
| 2011/0081920 A1* | 4/2011 | Hung et al. ................ 455/456.3 |
| 2011/0087749 A1* | 4/2011 | Swink et al. ................ 709/206 |
| 2011/0279323 A1* | 11/2011 | Hung et al. ................ 342/451 |
| 2012/0176525 A1* | 7/2012 | Garin et al. ............. 348/333.02 |

* cited by examiner

*Primary Examiner* — April G Gonzales
(74) *Attorney, Agent, or Firm* — Morgan, Lewis & Bockius LLP

(57) ABSTRACT

A first mobile device reports its current location in response to a message from a second computing device. The first mobile device extracts a source identifier and a location inquiry from the message and determines whether the source identifier and the location inquiry satisfy pre-determined conditions. If it is determined that the pre-determined conditions are satisfied, the first mobile device retrieves current location information from a location positioning module in the first mobile device and generates a message including the current location information. The first mobile device then sends the message to the second computing device. Upon receipt of the message, an instant messaging application of the second computing device is configured to visualize the first mobile device's location on a map application in accordance with the current location information extracted from the message.

20 Claims, 7 Drawing Sheets

---

The first terminal device receives the location information obtaining request of the first terminal device sent by the second terminal device — 101

↓

If determining that the mentioned characteristic message accords with the predefined condition, retrieve the GPS location information of the mentioned first terminal device — 102

↓

Send the mentioned GPS location information to the second terminal device to make the mentioned second terminal device obtain the location information of the mentioned first terminal device — 103

SYSTEM AND METHOD FOR LOCATING A MOBILE DEVICE

RELATED APPLICATIONS

This application is a continuation application of PCT Patent Application No. PCT/CN2013/090001, entitled "SYSTEM AND METHOD FOR LOCATING A MOBILE DEVICE" filed Dec. 19, 2013, which claims priority to Chinese Patent Application No. 201310204045.6, "SYSTEM AND METHOD FOR LOCATING A TERMINAL DEVICE" filed May 28, 2013, both of which are hereby incorporated by reference in their entirety.

FIELD OF THE INVENTION

The present application relates to the information technical field, especially relates to system and method for locating a mobile device.

BACKGROUND OF THE INVENTION

With the continuous development of the mobile device, the application of mobile device is used more and more widely, the function of mobile device is stronger and stronger. Among which, the location information of mobile device can be obtained effectively by the locating function of mobile device. For example, the user can obtain the location information of current user locating by the locating function of the phone.

However, the conventional mobile device obtains the location information by the locating method of mobile network, due to the poor locating accuracy of the locating method of mobile network, the location information of the mobile device obtained by the mobile device has large error and low accuracy. For example, if the user loses his or her phone, because the location accuracy of the conventional mobile device is low, the accurate location of the lost phone cannot be obtained by the locating method of the current mobile device, which makes it impossible for the user to obtain the location of lost phone accurately to find out the lost phone.

SUMMARY

The above deficiencies and other problems associated with the conventional approach of locating a mobile device are reduced or eliminated by the invention disclosed below. In some embodiments, the invention is implemented in a mobile device (e.g., a smartphone or a tablet computer) that has one or more processors, memory and one or more modules, programs or sets of instructions stored in the memory for performing multiple functions. Instructions for performing these functions may be included in a computer program product configured for execution by one or more processors.

In accordance with some embodiments, a method of locating a mobile device is performed at a first mobile device having one or more processors and memory. The method includes: receiving a message from a second computing device using an instant messaging application; extracting a source identifier and a location inquiry from the message; determining whether the source identifier and the location inquiry satisfy pre-determined conditions; in accordance with a determination that the pre-determined conditions are satisfied, retrieving current location information from a location positioning module in the first mobile device; generating a message, the message including the current location information; and sending the message to the second computing device, wherein an instant messaging application of the second computing device is configured to visualize the first mobile device's location on a map application in accordance with the current location information extracted from the message.

In accordance with some embodiments, a first mobile device includes one or more processors, memory, and one or more program modules stored in the memory and to be executed by the one or more processors, the one or more program modules further including: a receiving module configured to receive a message from a second computing device using an instant messaging application; an extracting module configured to extract a source identifier and a location inquiry from the message; a determination module configured to determine whether the source identifier and the location inquiry satisfy pre-determined conditions; a retrieving module configured to retrieve current location information from a location positioning module in the first mobile device in accordance with a determination that the pre-determined conditions are satisfied; a generating module configured to generate a message, the message including the current location information; and a transmitting module configured to send the message to the second computing device, wherein an instant messaging application of the second computing device is configured to visualize the first mobile device's location on a map application in accordance with the current location information extracted from the message.

In accordance with some embodiments, a non-transitory computer readable storage medium stores one or more program modules for execution by one or more processors of a first mobile device to report the current location of the first mobile device, the one or more program modules further including: a receiving module configured to receive a message from a second computing device using an instant messaging application; an extracting module configured to extract a source identifier and a location inquiry from the message; a determination module configured to determine whether the source identifier and the location inquiry satisfy pre-determined conditions; a retrieving module configured to retrieve current location information from a location positioning module in the first mobile device in accordance with a determination that the pre-determined conditions are satisfied; a generating module configured to generate a message, the message including the current location information; and a transmitting module configured to send the message to the second computing device, wherein an instant messaging application of the second computing device is configured to visualize the first mobile device's location on a map application in accordance with the current location information extracted from the message.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

In order to explain the technical program in the embodiment of the present application clearly, the following will briefly introduce the attached drawings required in the description of the embodiment or conventional technology, obviously, the drawings in the following description are only some embodiments of the present application, for the common technicians of this field, they can also obtain other drawings according to these drawings without any creative labor.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In the following, combined with the attached drawings of the embodiment of the present application, the technical scheme of the embodiment of the present application will be described clearly and entirely, obviously, the described embodiments are only some of the embodiments, not all of them. Based on the embodiment of the present application, all the other embodiments obtained by the common technicians of this field without any creative labor belong to the protective scope of the present application.

In order to make a clearer understanding of the technical scheme of the present application, the present application is described in detail below with reference to the attached drawings and embodiments.

Figure 1:
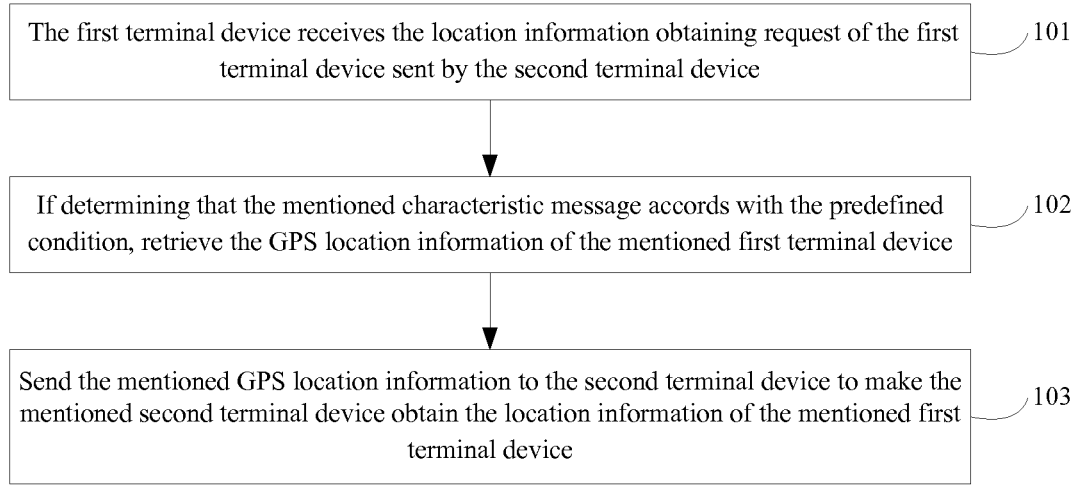
FIG. 1 is the flowchart diagram of the locating method of a mobile device provided by this embodiment.

The locating method of a mobile device provided by this embodiment, as shown in FIG. 1, the mentioned method includes:

Step 101, the first mobile device receives the location information obtaining request of the first mobile device sent by the second mobile device.

Among which, the mentioned location information obtaining request includes the characteristic message, the second mobile device can send the short message carrying the characteristic message to request the first mobile device to obtain and feedback the current location information. Among which, the characteristic message can be English words, such as find phone; or the Chinese key words, such as feeding back the phone location; or the number characteristic value, such as the user's birthday date, the identifying code preset by the user, etc., this embodiment does not limit hereto.

Step 102, if determining that the mentioned characteristic message accords with the predefined condition, retrieve the GPS location information of the mentioned first mobile device.

Among which, the predefined condition can be English words, such as find phone; or the Chinese key words, such as feeding back the phone location; or the number characteristic value, such as the user's birthday date, the identifying code preset by the user, etc., which can be set according to the specific demands of the user, this embodiment does not limit hereto. The first mobile device can obtain the location information of the current mobile device by the built-in GPS location provider specifically, this embodiment does not limit hereto.

Step 103, send the mentioned GPS location information to the second mobile device to make the mentioned second mobile device obtain the location information of the mentioned first mobile device.

For this embodiment, the applied scene can be but is not limited in the following types, including: when the phone A used by the user is lost, the user can use phone B to send a short message with content of find phone to phone A, when the phone A confirms that the information content in the received short message is the same as the characteristic message defined in the predefined condition, the phone A can obtain the GPS location information, and then phone A sends the GPS location information to phone B in form of short message to make the user obtain the current accurate location of phone A by phone B to find out the lost phone in time.

It should be noted that, the aforementioned application scene is only the example description; it does not constitute the limit to this embodiment.

For the locating method of a mobile device provided by this embodiment, comparing with the method that the conventional mobile device obtains the location information by the locating method of mobile network, the mobile device of this embodiment obtains the location information of mobile device by the built-in GPS location provider, specifically, firstly receiving the location information obtaining request of the first mobile device sent by the second mobile device, the mentioned location information obtaining request includes characteristic message, when determining that the mentioned characteristic message accords with the predefined condition, retrieve the GPS location information of the mentioned first mobile device, finally send the mentioned GPS location information to the mentioned second mobile device to make the mentioned second mobile device obtain the location information of the mentioned first mobile device, so as to increase the locating accuracy of mobile device and decrease the error of location information obtained by the mobile device.

Figure 2:
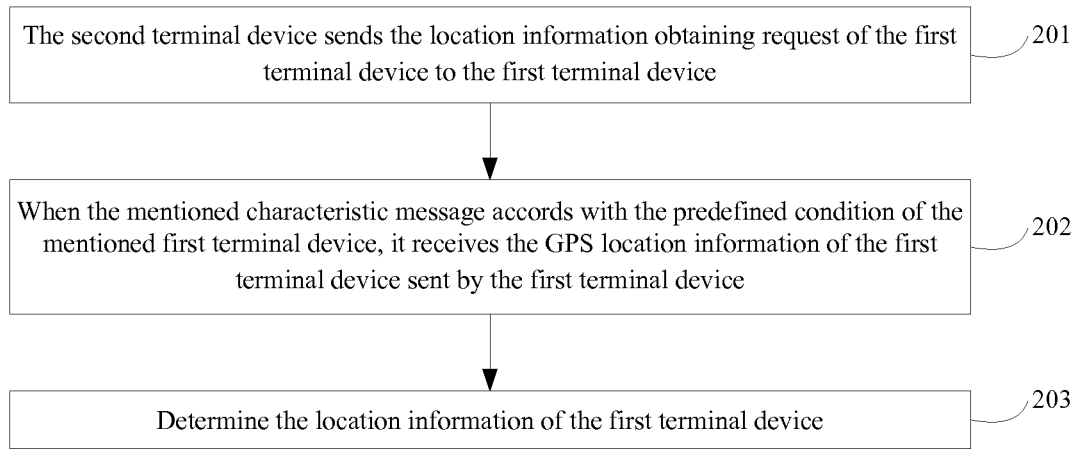
FIG. 2 is the flowchart diagram of the locating method of another mobile device provided by this embodiment.

Furthermore, the locating method of another mobile device provided by this embodiment, as shown in FIG. 2, the mentioned method includes:

Step 201, the second mobile device sends the location information obtaining request of the first mobile device to the first mobile device.

Among which, the mentioned location information obtaining request includes the characteristic message, the second mobile device can send the short message carrying the characteristic message to request the first mobile device to obtain and feedback the current location information. Among which, the characteristic message can be English words, such as find phone; or the Chinese key words, such as feeding back the phone location; or the number characteristic value, such as the user's birthday date, the identifying code preset by the user, etc., this embodiment does not limit hereto.

Step 202, when the mentioned characteristic message accords with the predefined condition of the mentioned first mobile device, it receives the GPS location information of the first mobile device sent by the first mobile device.

Among which, the predefined condition can be English words, such as find phone; or the Chinese key words, such as feeding back the phone location; or the number characteristic value, such as the user's birthday date, the identifying code preset by the user, etc., which can be set according to the specific demands of the user, this embodiment does not limit hereto. The first mobile device can obtain the location information of the current mobile device by the built-in GPS location provider specifically, this embodiment does not limit hereto.

Step 203, determine the location information of the first mobile device.

Specifically, the second mobile device can determine the location information of the first mobile device according to the received GPS location information of the first mobile device.

For the locating method of another mobile device provided by this embodiment, comparing with the method that the conventional mobile device obtains the location information by the locating method of mobile network, the mobile device of this embodiment obtains the location information of mobile device by the built-in GPS location provider, specifically, firstly the second mobile device sends the location information obtaining request of the first mobile device to the first mobile device, when the mentioned characteristic message accords with the predefined condition of the mentioned first mobile device, it receives the GPS location information of the first mobile device sent by the first mobile device, finally determined the location information of the mentioned first mobile device, so as to increase the locating accuracy of mobile device and decrease the error of location information obtained by the mobile device.

Figure 3:
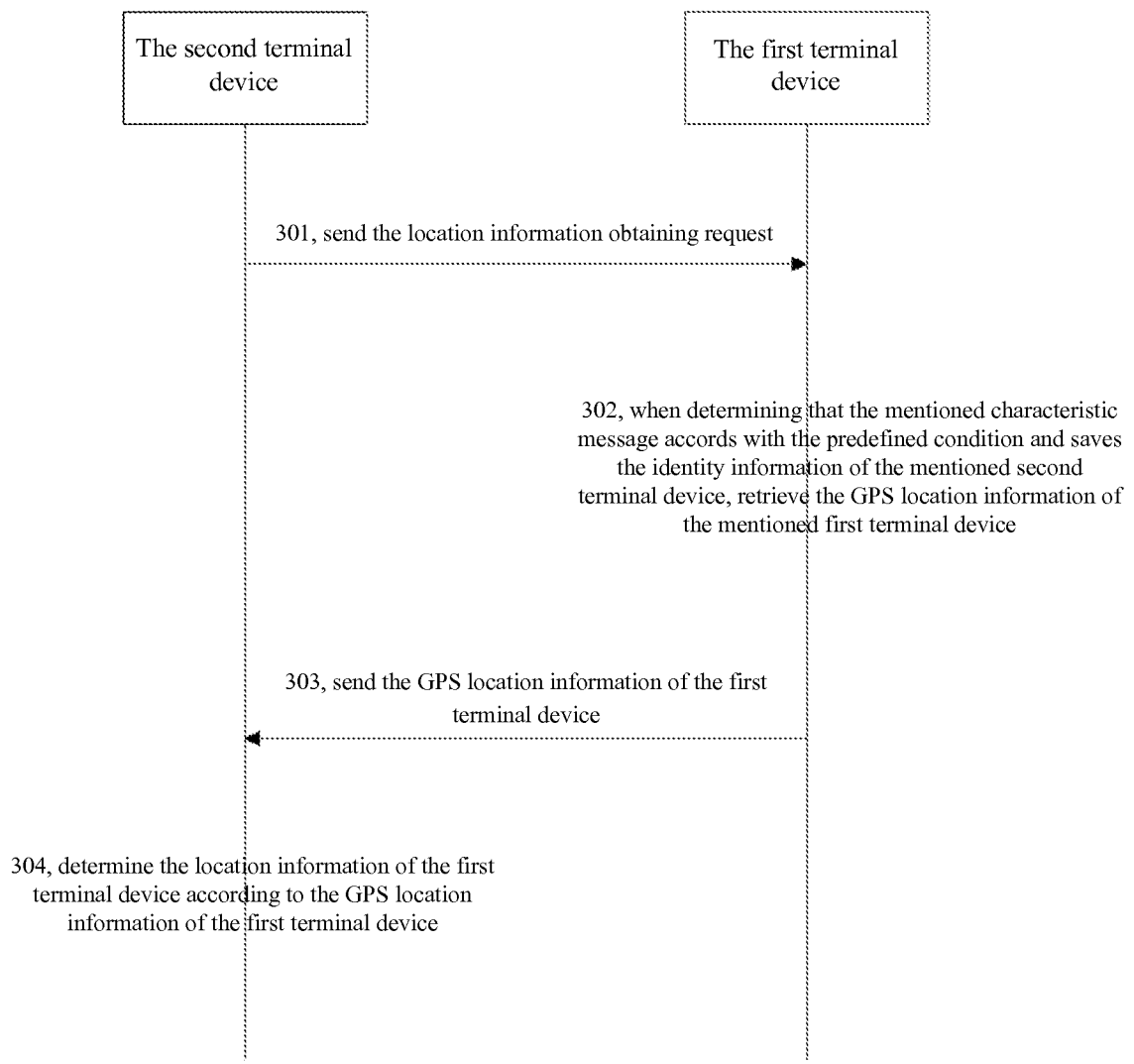
FIG. 3 is the flowchart diagram of the locating method of another mobile device provided by this embodiment.

Furthermore, the locating method of another mobile device provided by this embodiment, as shown in FIG. 3, the mentioned method includes:

Step 301, the second mobile device sends the location information obtaining request to the first mobile device.

Among which, the mentioned location information obtaining request includes the characteristic message and/or the identity information of the second mobile device, the second mobile device can send the short message carrying the characteristic message to request the first mobile device to obtain and feedback the current location information. Among which, the characteristic message can be English words, such as find phone; or the Chinese key words, such as feeding back the phone location; or the number characteristic value, such as the user's birthday date, the identifying code preset by the user, etc., this embodiment does not limit hereto. The identity information of the second mobile device is the identification information of the mentioned second mobile device, for example, the identification information of the phone can be the number of the phone.

Step 302, when the first mobile device determines that the mentioned characteristic message accords with the predefined condition and saves the identity information of the mentioned second mobile device, retrieve the GPS location information of the mentioned first mobile device.

Among which, the predefined condition can be English words, such as find phone; or the Chinese key words, such as feeding back the phone location; or the number characteristic value, such as the user's birthday date, the identifying code preset by the user, etc., which can be set according to the specific demands of the user, this embodiment does not limit hereto. The first mobile device can obtain the location information of the current mobile device by the built-in GPS location provider specifically, this embodiment does not limit hereto.

Specifically, the first mobile device obtains the GPS location information of the first mobile device according to the preset time interval, and then the first mobile device obtains the GPS location information of the mentioned first mobile device corresponding to the adjacent time points respectively, the changing difference between the mentioned GPS location information, if the mentioned changing difference is larger or equal to the preset threshold, the mentioned first mobile device will send the changed GPS location information of the mentioned first mobile device to the mentioned second mobile device to make the mentioned second mobile device obtain the location information of the first mobile device. It can be seen that, this embodiment can monitor the location change of the mobile device at real time and feedback the changed location information of mobile device to increase the locating accuracy of mobile device.

Among which, the preset time interval and preset threshold can be set according to the user demand, for example, the user can set the mobile device to obtain the location information of mobile device once every 2 seconds and set that when the changing values between the locations respectively corresponding to the two adjacent time points is larger or equal to 10 meters, then feedback the changed GPS location information, that is when the changing values between the locations respectively corresponding to the two time points of the adjacent time is smaller, it does not feedback the changed GPS location information, so as to reduce the resource waste.

Step 303, the first mobile device sends the GPS location information obtaining request of the first mobile device to the second mobile device.

Step 304, the second mobile device determines the location information of the first mobile device according to the GPS location information of the first mobile device.

For this embodiment, the applied scenes can be include but does not limit the following types, including: when the phone A used by the user is lost, the user can use phone B to send a short message with content of find phone to phone A, when the phone A confirms that the predefined condition is find phone and judges that the number of phone B is saved, phone A obtains the current GPS location information and then phone A sends the current GPS location information as the content of short message to phone B to make the user obtain the current accurate location of phone A by phone B, and phone A obtains GPS location information again after 10 seconds of the preset time interval, if phone A judges that the changing between the current GPS location information and GPS location information before 10 seconds is larger than 15 meters, phone A will send the changed GPS location information to phone B as the content of short message, so as to increase the locating accuracy of mobile device of this embodiment.

It should be noted that, the aforementioned application scene is only the example description; it does not constitute the limit to this embodiment.

For the locating method of another mobile device provided by this embodiment, comparing with the method that the conventional mobile device obtains the location information by the locating method of mobile network, it obtains the location information of mobile device by the built-in GPS location provider, specifically, firstly, the first mobile device receives the location information obtaining request of the first mobile device sent by the second mobile device, the mentioned location information obtaining request includes characteristic message, when the first mobile device determines that the mentioned characteristic message accords with the predefined condition, it retrieves the GPS location information of the mentioned first mobile device, finally the first mobile device sends the mentioned GPS location information to the mentioned second mobile device to make the mentioned second mobile device obtain the location information of the mentioned first mobile device, so as to increase the locating accuracy of mobile device and decrease the error of location information obtained by the mobile device.

Figure 4:
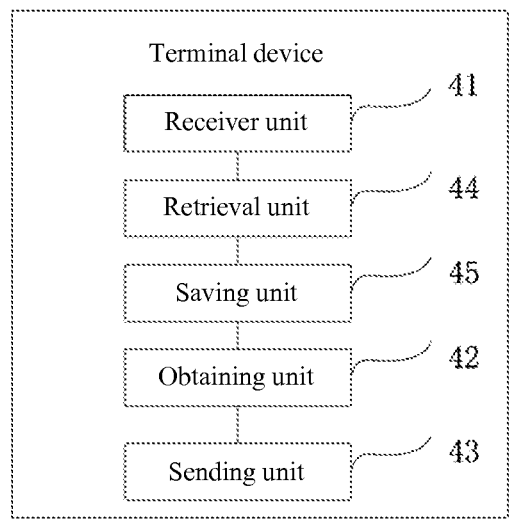
FIG. 4 is a schematic diagram showing the structure of the mobile device provided by this embodiment.

Furthermore, as the realization of the method embodiments shown in FIG. 1 or FIG. 3, this embodiment provides a mobile device, the mentioned mobile device can be phone, computer, laptop, etc, as shown in FIG. 4, the mentioned mobile device includes: receiver unit 41, retrieval unit 42, sending unit 43, obtaining unit 44 and saving unit 45.

Receiver unit 41 can be used to receive the location information obtaining request sent by the second mobile device, the mentioned location information obtaining request includes characteristic message.

Retrieval unit 42 can be used to determine that when the mentioned characteristic message received by the mentioned receiver unit 41 accords with the predefined condition, retrieve the GPS location information.

Sending unit 43 can be used to send the mentioned GPS location information retrieved by the mentioned retrieval unit 42 to the mentioned second mobile device to make the second mobile device obtain the location information.

Obtaining unit 44 can be used to obtain the mentioned GPS location information before the mentioned retrieval unit 42 retrieves the mentioned GPS location information.

Saving unit 45 can be used to save the mentioned GPS location information obtained by the mentioned obtaining unit 44.

Obtaining unit 44 can be used to obtain the mentioned GPS location information according to the preset time interval.

Obtaining unit 44 can also be used to obtain the GPS location information corresponding to the adjacent time points.

Obtaining unit 44 can also be used to obtain the changing difference between GPS location information respectively corresponding to the mentioned adjacent time points.

Sending unit 43 can also be used to send the changed mentioned GPS location information to the mentioned second mobile device when the mentioned changing difference obtained by the mentioned obtaining unit 44 is larger or equal to the preset threshold to make the mentioned second mobile device obtain the location information.

It should be noted that, the location information obtaining request received by the receiver unit 41 of this embodiment can also include the identity information of the mentioned second mobile device.

Retrieval unit 42 can be used to retrieve the GPS location information when determining that the mentioned characteristic message accords with the predefined condition and saving the identity information of the mentioned second mobile device.

It should be noted that, the other corresponding description of each functional unit involved by the mobile device provided by this embodiment can refer to the description corresponding to FIG. 1 or FIG. 3, this embodiment will not discuss more about it hereby.

The mobile device provided by this embodiment, comparing with the method that the conventional mobile device obtains the location information by the locating method of mobile network, obtains the location information of mobile device by the built-in GPS location provider, specifically, firstly receiving the location information obtaining request sent by the second mobile device, the mentioned location information obtaining request includes characteristic message, when determining that the mentioned characteristic message accords with the predefined condition, retrieve the GPS location information of the mentioned first mobile device, finally send the mentioned GPS location information to the mentioned second mobile device to make the mentioned second mobile device obtain the location information of the mentioned first mobile device, so as to increase the locating accuracy of mobile device and decrease the error of location information obtained by the mobile device.

Figure 5:
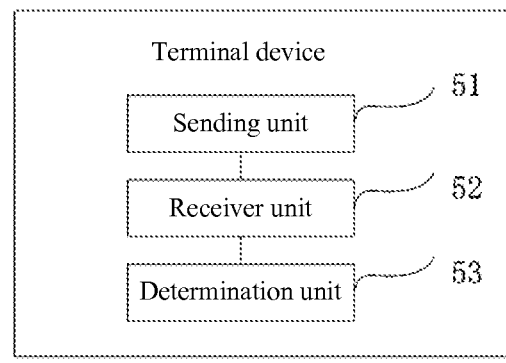
FIG. 5 is a schematic diagram showing the structure of another mobile device provided by this embodiment.

Furthermore, as the realization of the method embodiments shown in FIG. 2 or FIG. 3, this embodiment provides another mobile device, the mentioned mobile device can be phone, computer, laptop, etc, as shown in FIG. 5, the mentioned mobile device includes: sending unit 51, receiver unit 52 and determination unit 53.

Sending unit 51 can be used to send the location information obtaining request of the first mobile device to the first mobile device, the mentioned location information obtaining request includes characteristic message.

Receiver unit 52 can be used to receive the GPS location information of the mentioned first mobile device sent by the mentioned first mobile device when the mentioned characteristic message sent by the mentioned sending unit 51 accords with the predefined condition of the mentioned first mobile device.

Determination unit 53 can be used to determine the location information of the first mobile device according to the GPS location information of the mentioned first mobile device received by the mentioned receiver unit 52.

Receiving unit 52 can also be used to receive the changed GPS location information of the mentioned first mobile device sent by the mentioned first mobile device when the changing difference between GPS location information of the mentioned first mobile device respectively corresponding to the adjacent time points is larger or equal to the preset threshold.

It should be noted that, the location information obtaining request sent by the sending unit 51 of this embodiment can also include the identity information of the mentioned second mobile device.

Receiver unit 52 can be used to receive the GPS location information of the mentioned first mobile device sent by the mentioned first mobile device when the mentioned characteristic accords with the predefined condition of the mentioned first mobile device and the mentioned first mobile device saves the mentioned identity information.

It should be noted that, the other corresponding description of each functional unit involved by another mobile device provided by this embodiment can refer to the description corresponding to FIG. 2 or FIG. 3, this embodiment will not discuss more about it hereby.

Another mobile device provided by this embodiment, comparing with the method that the conventional mobile device obtains the location information by the locating method of mobile network, obtains the location information of mobile device by the built-in GPS location provider, specifically, firstly sending the location information obtaining request of the first mobile device to the first mobile device, when the mentioned characteristic message accords with the predefined condition of the mentioned first mobile device, it receives the GPS location information of the first mobile device sent by the first mobile device, finally determined the location information of the mentioned first mobile device, so as to increase the locating accuracy of mobile device and decrease the error of location information obtained by the mobile device.

Figure 6:
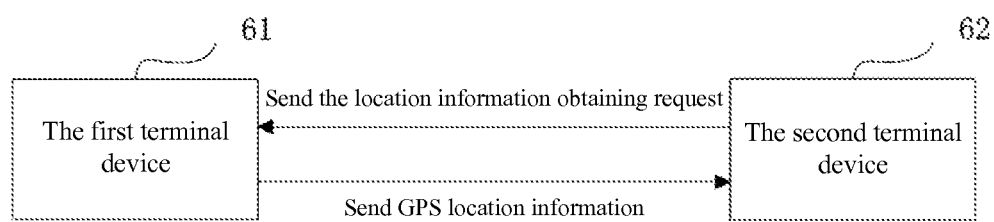
FIG. 6 is a schematic diagram showing the structure of the locating system of mobile device provided by this embodiment.

Furthermore, as the realization of the method embodiment shown in FIG. 3, this embodiment provides a mobile device locating system, as shown in FIG. 6, the mentioned mobile device locating system includes the first mobile device 61 and the second mobile device 62.

The first mobile device 61, can be used to receive the location information obtaining request sent by the mentioned second mobile device 62, the mentioned location information obtaining request includes characteristic message, when determining that the mentioned characteristic message accords with preset condition, retrieve the GPS location information and send the mentioned GPS location information to the mentioned second mobile device 62.

The second mobile device 62, can be used to determine the location information of the mentioned first mobile device 61.

It should be noted that, the other corresponding description of the mobile device locating system provided by this embodiment can refer to the description corresponding to FIG. 3, this embodiment will not discuss more about it hereby.

Figure 7:
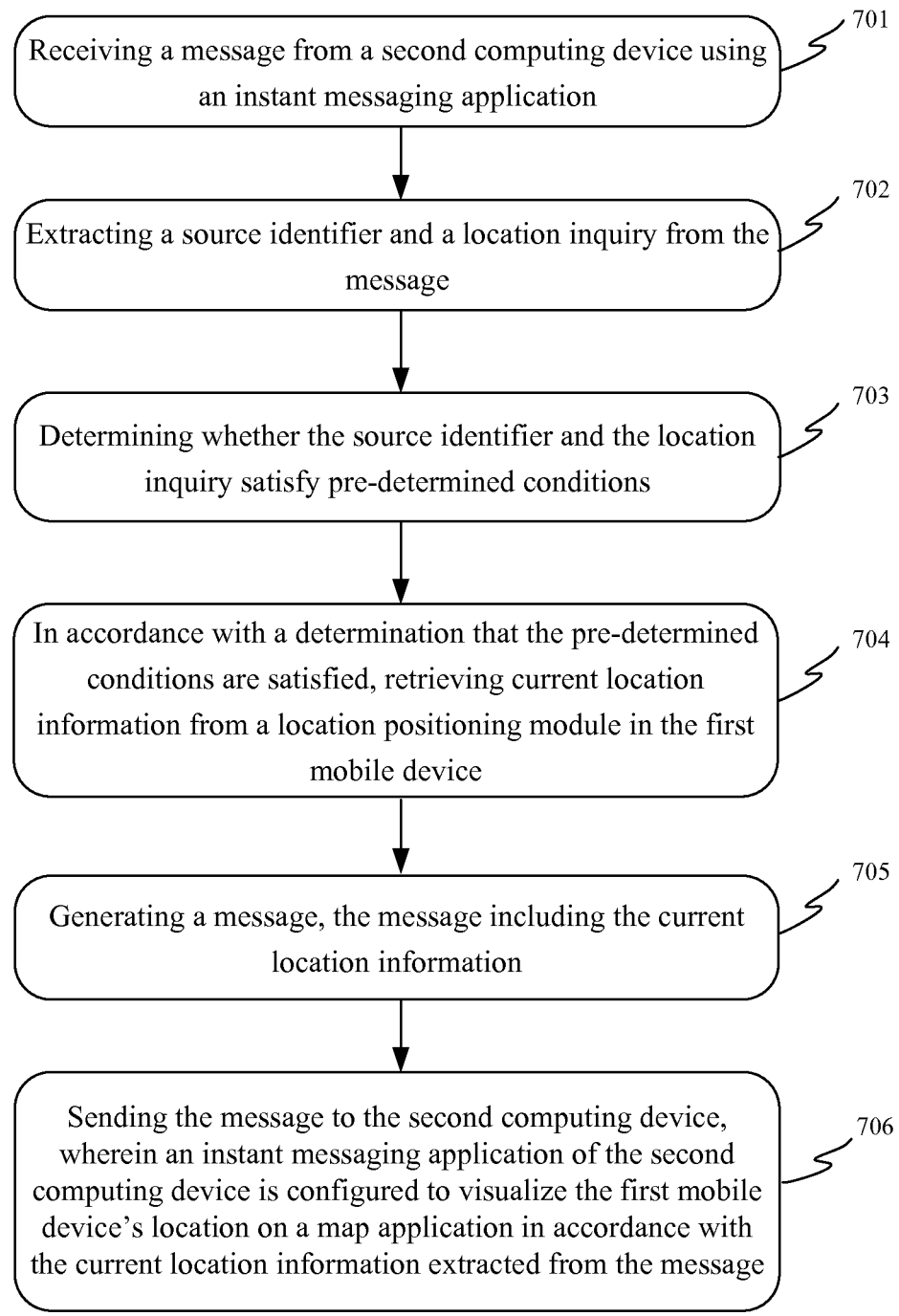
FIG. 7 is a flow chart of a method of locating a mobile device according to some embodiments of the present application.

FIG. 7 is a flow chart of a method of locating a mobile device according to some embodiments of the present application. The method of locating a mobile device according to some embodiments of the present application comprises at a first mobile device having one or more processors and memory: receiving a message from a second computing device using an instant messaging application 701; extracting a source identifier and a location inquiry from the message 702; determining whether the source identifier and the location inquiry satisfy pre-determined conditions 703; in accordance with a determination that the pre-determined conditions are satisfied, retrieving current location information from a location positioning module in the first mobile device 704; generating a message, the message including the current location information 705; and sending the message to the second computing device, wherein an instant messaging application of the second computing device is configured to visualize the first mobile device's location on a map application in accordance with the current location information extracted from the message 706.

Figure 8:
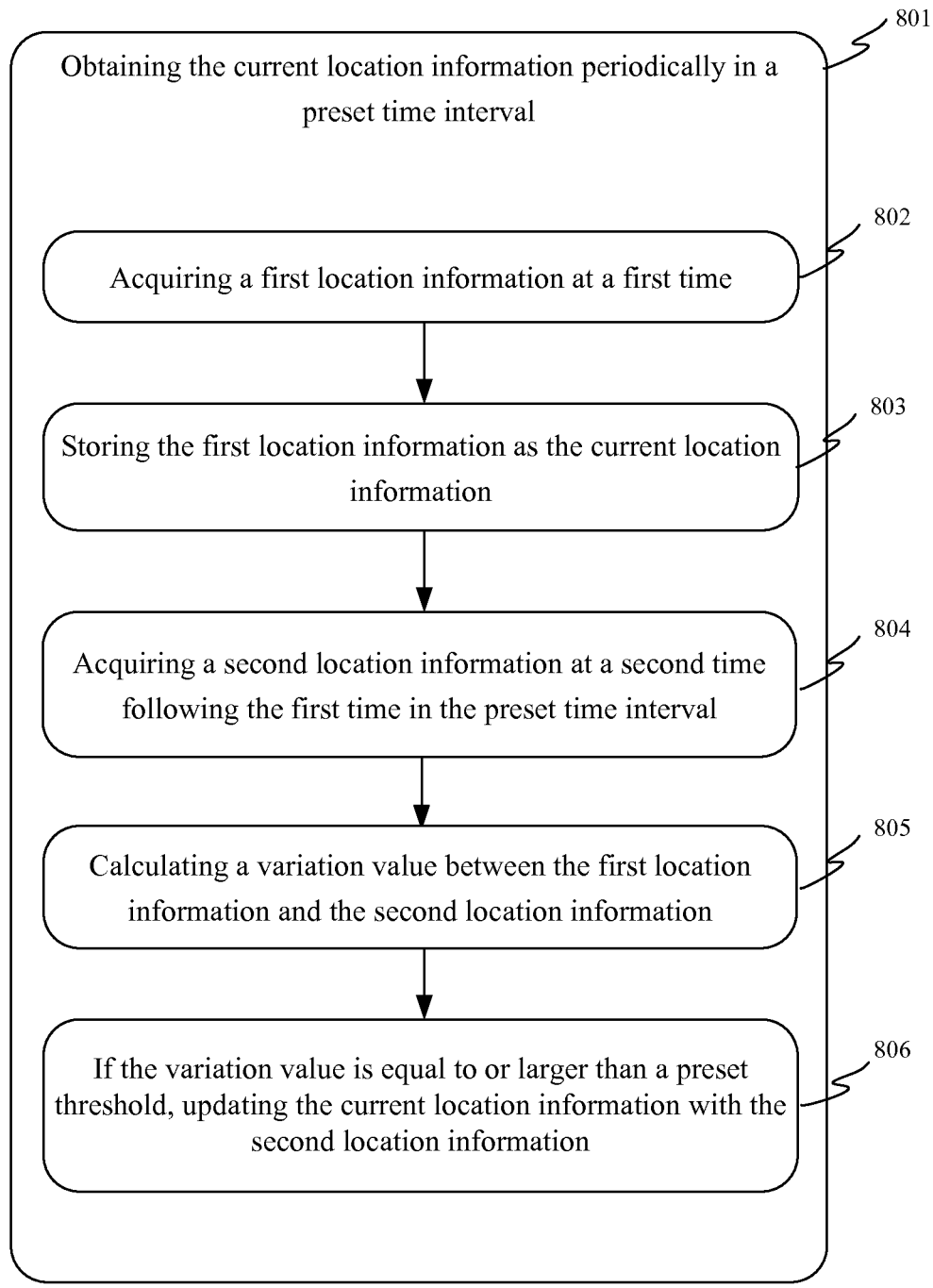
FIG. 8 is another flow chart of a method of locating a mobile device according to some embodiments of the present application.

FIG. 8 is another flow chart of a method of locating a mobile device according to some embodiments of the present application. The method of locating a mobile device according to some embodiments of the present application further comprises obtaining the current location information periodically in a preset time interval 801, which includes acquiring a first location information at a first time 802; storing the first location information as the current location information 803; acquiring a second location information at a second time following the first time in the preset time interval 804; calculating a variation value between the first location information and the second location information 805; and if the variation value is equal to or larger than a preset threshold, updating the current location information with the second location information 806.

Figure 9:
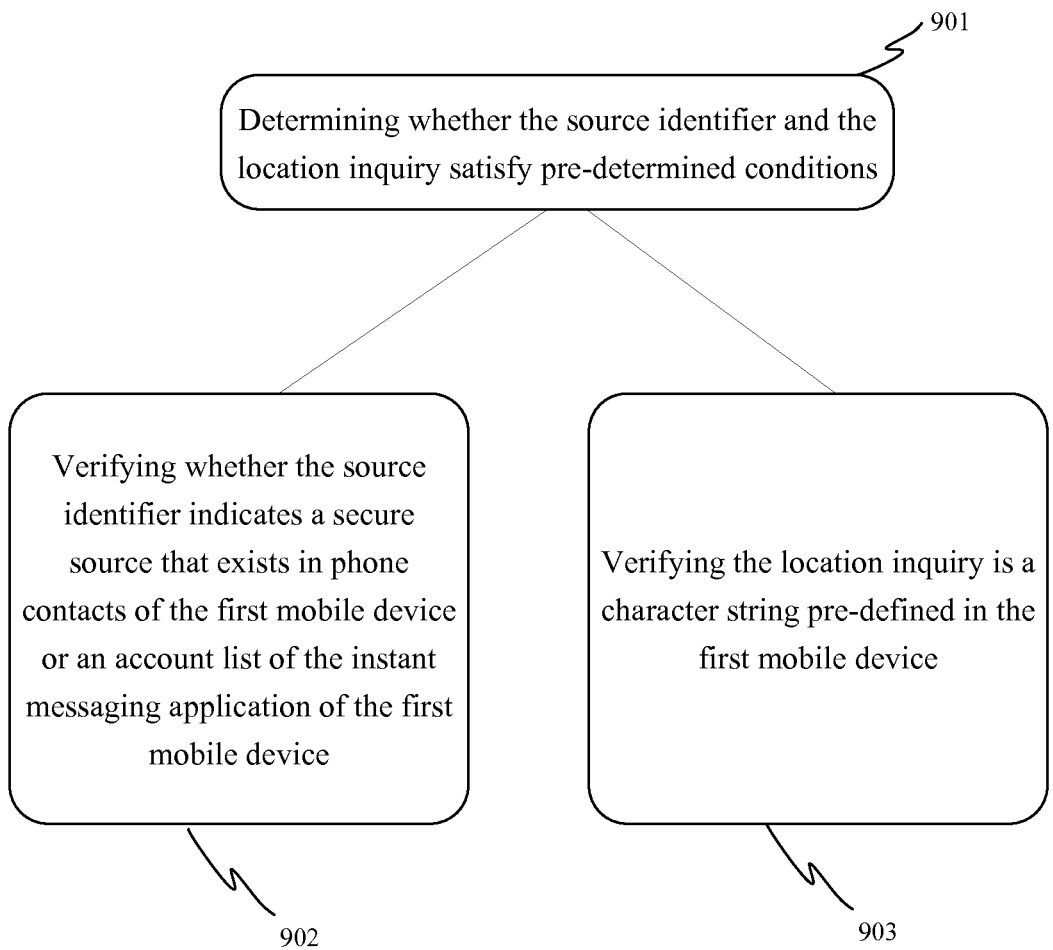
FIG. 9 is yet another flow chart of a method of locating a mobile device according to some embodiments of the present application.

FIG. 9 is yet another flow chart of a method of locating a mobile device according to some embodiments of the present application. According to some embodiments of the present application, determining whether the source identifier and the location inquiry satisfy pre-determined conditions 901 further comprises verifying whether the source identifier indicates a secure source that exists in phone contacts of the first mobile device or an account list of the instant messaging application of the first mobile device 902; and verifying whether the location inquiry is a character string pre-defined in the first mobile device 903.

Figure 10:
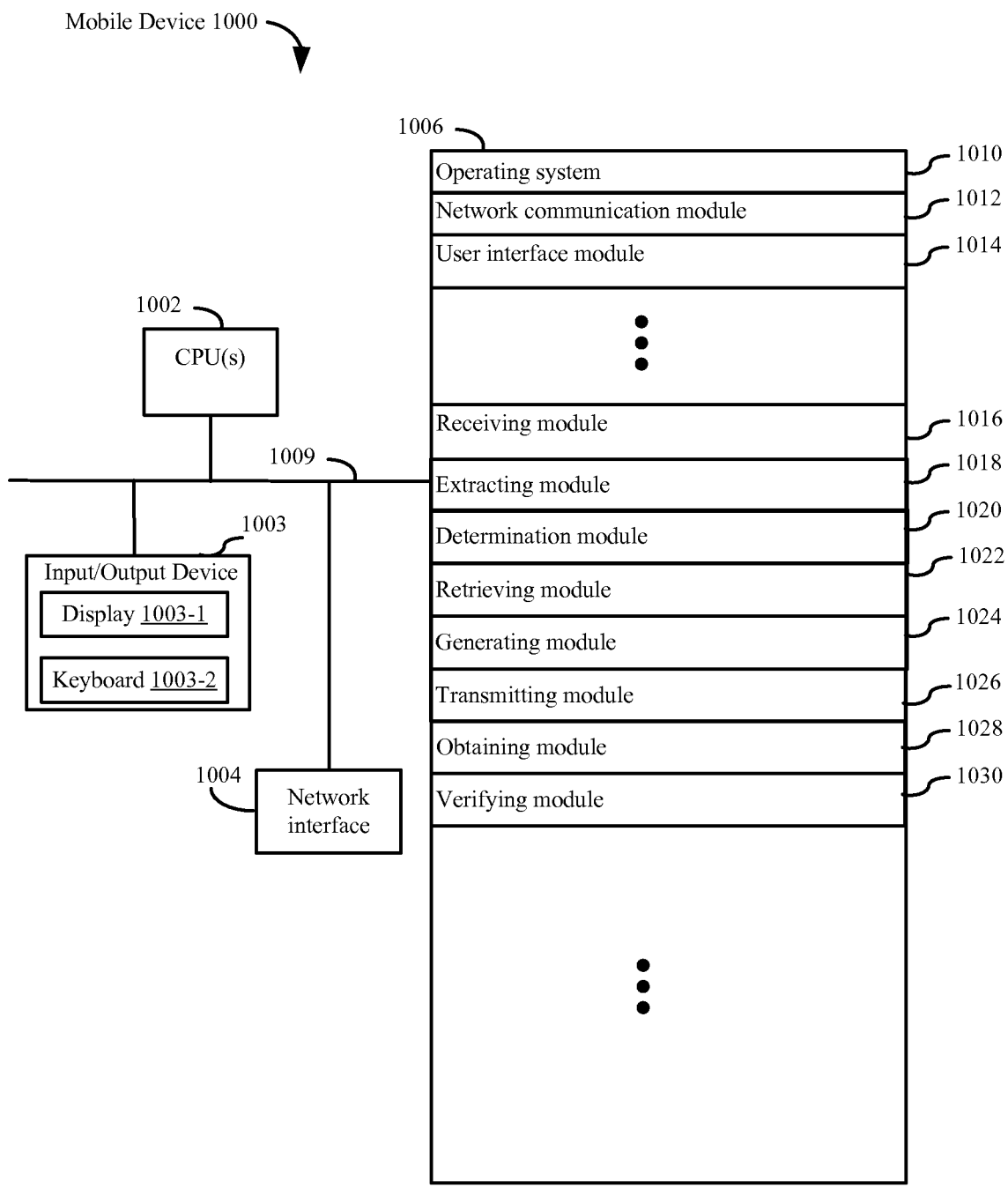
FIG. 10 is a block diagram of a system of locating a mobile device according to some embodiments of the present application.

FIG. 10 is a block diagram of a system of locating a mobile device according to some embodiments of the present application. The mobile device 1000 typically includes one or more CPU(s) 1002, an input/output device 1003, a network interface 1004, memory 1006, and one or more communication buses 1009 for interconnecting these components. The communication buses 1009 may include circuitry (sometimes called a chipset) that interconnects and controls communications between system components. The input/output device 1003 includes, for instance, a display 1003-1 and a keyboard 1003-2. The memory 1006 may include high speed random access memory and may also include non-volatile memory, such as one or more magnetic disk storage devices. The memory 1006 may include mass storage that is remotely located from the CPU(s) 1002. In some embodiments, the memory 1006, or alternately the non-volatile memory device(s) within the memory 1006, comprises a non-transitory computer readable storage medium.

The memory 1006 or the computer readable storage medium of the memory 1006 stores the following elements, or a subset of these elements, and may also include additional elements:

a receiving module 1016 configured to receive a message from a second computing device using an instant messaging application;

an extracting module 1018 configured to extract a source identifier and a location inquiry from the message;

a determination module 1020 configured to determine whether the source identifier and the location inquiry satisfy pre-determined conditions;

a retrieving module 1022 configured to retrieve current location information from a location positioning module in the first mobile device in accordance with a determination that the pre-determined conditions are satisfied;

a generating module 1024 configured to generate a message, the message including the current location information;

a transmitting module 1026 configured to send the message to the second computing device, wherein an instant messaging application of the second computing device is configured to visualize the first mobile device's location on a map application in accordance with the current location information extracted from the message;

an obtaining module 1028 configured to obtain the current location information periodically in a preset time interval; and a verifying module 1030 configured to verify whether the source identifier indicates a secure source that exists in phone contacts of the first mobile device or an account list of the instant messaging application of the first mobile device.

In some embodiments, the obtaining module 1028 of the first mobile device is further configured to acquire a first location information at a first time; store the first location information as the current location information; acquire a second location information at a second time following the first time in the preset time interval; calculate a variation value between the first location information and the second location information; and if the variation value is equal to or larger than a preset threshold, update the current location information with the second location information.

In some embodiments, the verifying module 1030 is further configured to verify whether the location inquiry is a character string pre-defined in the first mobile device.

In some embodiments, the instant messaging application running on the first mobile device allows its user to specify criteria under which the first mobile device may report its current location information. For example, the user may log into his/her account through the instant messaging application and provide one or more source identifiers, which may be the user identifiers of other people the user trusts or their phone numbers, and a security code (e.g., in the form of a character string) to the instant messaging application. The instant messaging application then stores the information in a secure location such that it is invisible and cannot be deleted from the first mobile device either unless the user can answer one or more security questions. With the information in place, the user can easily track down the location of the first mobile device by logging into a user account associated with one of the source identifiers registered with the first mobile device and sending a predefined message including the security code to the first mobile device.

For example, if the first mobile device is stolen by somebody else, the user can track down its current location as long as the instant messaging application of the first mobile device can be started on the first mobile device to process the incoming message, retrieve the current location information, and generate the outgoing message including the current location information while another application is being executed on the first mobile device. In some embodiments, the instant messaging application always has a backend process in operation for processing incoming messages. Upon receipt of an incoming message, the backend process determines whether it relates to location positioning. If so, the backend process will perform the operations as described above without generating any visual cue on the display of the first mobile device. By doing so, it is more difficult for the new user to find out that the first mobile device is reporting its current location and then completely shut it down. As a result, it is more likely that the owner of the first mobile device can use this feature to locate the first mobile device without tipping the new user.

For the mobile device locating system provided by this embodiment, when compared with the method that the conventional mobile device obtains the location information by the locating method of mobile network, it obtains the location information of mobile device by the built-in GPS location provider, specifically, firstly, the first mobile device receives the location information obtaining request of the first mobile device sent by the second mobile device, the mentioned location information obtaining request includes characteristic message, when the first mobile device determines that the mentioned characteristic message accords with the predefined condition, it retrieves the GPS location information of the mentioned first mobile device, finally the first mobile device sends the mentioned GPS location information to the mentioned second mobile device to make the mentioned second mobile device obtain the location information of the mentioned first mobile device, so as to increase the locating accuracy of mobile device and decrease the error of location information obtained by the mobile device.

The mobile device and mobile device locating system provided by the embodiment of the present application can realize the above provided embodiment, please refer to the description in the method embodiment for the specific functional realization, it will not be discussed more hereby. The locating method of mobile device, the mobile device and mobile device locating system provided by the embodiment of the present application can be used in information technical field, but it is not limited to here.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method of locating a mobile device, the method comprising:
    at a first mobile device having one or more processors and memory:
        receiving a message from a second computing device using an instant messaging application;
        extracting a source identifier and a location inquiry from the message;

determining whether the source identifier and the location inquiry satisfy pre-determined conditions;
in accordance with a determination that the pre-determined conditions are satisfied, retrieving current location information from a location positioning module in the first mobile device;
generating a message, the message including the current location information; and
sending the message to the second computing device, wherein an instant messaging application of the second computing device is configured to visualize the first mobile device's location on a map application in accordance with the current location information extracted from the message.

2. The method according to claim 1, further comprising:
obtaining the current location information periodically in a preset time interval.

3. The method according to claim 2, further comprising:
acquiring first location information at a first time;
storing the first location information as the current location information;
acquiring second location information at a second time after the preset time interval from the first time;
calculating a variation value between the first location information and the second location information; and
in accordance with that the variation value is equal to or larger than a preset threshold, updating the current location information with the second location information.

4. The method according to claim 1, further comprising:
verifying whether the source identifier corresponds to a secure source registered with the first mobile device or the instant messaging application of the first mobile device for retrieving location information.

5. The method according to claim 4, further comprising:
verifying whether the location inquiry is a character string pre-defined in the first mobile device.

6. The method according to claim 1, wherein the instant messaging application of the first mobile device is configured to process the incoming message, retrieve the current location information, and generate the outgoing message including the current location information in parallel to an execution of another application on the first mobile device.

7. The method according to claim 1, wherein the instant messaging application of the first mobile device is configured to operate in a backend process such that no visual cue is generated on a display of the first mobile device.

8. A first mobile device comprising:
one or more processors;
memory; and
one or more program modules stored in the memory and to be executed by the one or more processors, the one or more program modules further including:
a receiving module configured to receive a message from a second computing device using an instant messaging application;
an extracting module configured to extract a source identifier and a location inquiry from the message;
a determination module configured to determine whether the source identifier and the location inquiry satisfy pre-determined conditions;
a retrieving module configured to retrieve current location information from a location positioning module in the first mobile device in accordance with a determination that the pre-determined conditions are satisfied;
a generating module configured to generate a message, the message including the current location information; and
a transmitting module configured to send the message to the second computing device, wherein an instant messaging application of the second computing device is configured to visualize the first mobile device's location on a map application in accordance with the current location information extracted from the message.

9. The first mobile device according to claim 8, wherein the one or more program modules further include:
an obtaining module configured to obtain the current location information periodically in a preset time interval.

10. The first mobile device according to claim 9, wherein the obtaining module is further configured to:
acquire a first location information at a first time;
store the first location information as the current location information;
acquire a second location information at a second time following the first time in the preset time interval;
calculate a variation value between the first location information and the second location information; and
in accordance with that the variation value is equal to or larger than a preset threshold, update the current location information with the second location information.

11. The first mobile device according to claim 8, wherein the one or more program modules further include:
a verifying module configured to verify whether the source identifier indicates a secure source that exists in phone contacts of the first mobile device or an account list of the instant messaging application of the first mobile device.

12. The first mobile device according to claim 11, wherein the verifying module is further configured to verify whether the location inquiry is a character string pre-defined in the first mobile device.

13. The first mobile device according to claim 8, wherein the instant messaging application of the first mobile device is configured to process the incoming message, retrieve the current location information, and generate the outgoing message including the current location information in parallel to an execution of another application on the first mobile device.

14. The first mobile device according to claim 8, wherein the instant messaging application of the first mobile device is configured to operate in a backend process such that no visual cue is generated on a display of the first mobile device.

15. A non-transitory computer readable storage medium, storing one or more program modules for execution by one or more processors of a first mobile device, the one or more program modules further including:
a receiving module configured to receive a message from a second computing device using an instant messaging application;
an extracting module configured to extract a source identifier and a location inquiry from the message;
a determination module configured to determine whether the source identifier and the location inquiry satisfy pre-determined conditions;
a retrieving module configured to retrieve current location information from a location positioning module in the first mobile device in accordance with a determination that the pre-determined conditions are satisfied;
a generating module configured to generate a message, the message including the current location information; and
a transmitting module configured to send the message to the second computing device, wherein an instant messaging application of the second computing device is configured to visualize the first mobile device's location on a map application in accordance with the current location information extracted from the message.

16. The non-transitory computer readable storage medium according to claim 15, wherein the one or more program modules further include:
an obtaining module configured to obtain the current location information periodically in a preset time interval.

17. The non-transitory computer readable storage medium according to claim 16, wherein the obtaining module is further configured to:
acquire a first location information at a first time;
store the first location information as the current location information;
acquire a second location information at a second time following the first time in the preset time interval;
calculate a variation value between the first location information and the second location information; and
in accordance with that the variation value is equal to or larger than a preset threshold, update the current location information with the second location information.

18. The non-transitory computer readable storage medium according to claim 15, wherein the one or more program modules further include:
a verifying module configured to verify whether the source identifier indicates a secure source that exists in phone contacts of the first mobile device or an account list of the instant messaging application of the first mobile device.

19. The non-transitory computer readable storage medium according to claim 15, wherein the instant messaging application of the first mobile device is configured to process the incoming message, retrieve the current location information, and generate the outgoing message including the current location information in parallel to an execution of another application on the first mobile device.

20. The non-transitory computer readable storage medium according to claim 15, wherein the instant messaging application of the first mobile device is configured to operate in a backend process such that no visual cue is generated on a display of the first mobile device.

* * * * *